United States Patent [19]

Brown et al.

[11] 4,356,727

[45] Nov. 2, 1982

[54] CONTINUOUS VOLUME MEASURING SYSTEM

[76] Inventors: Carole E. Brown, 3385 Ebenezer Rd., Conyers, Ga. 30207; Dean M. Ball, 3596 Spaulding Ter., Norcross, Ga. 30071; Graham R. Killip, 3478 Pin Oak Cir., Doraville, Ga. 30340; James P. Olivier, 1841 Azalea Dr., Lawrenceville, Ga. 30245

[21] Appl. No.: 128,129

[22] Filed: Mar. 7, 1980

[51] Int. Cl.³ .......................... G01F 3/18; G01F 3/20
[52] U.S. Cl. ...................................... 73/243; 73/264
[58] Field of Search ................. 73/239, 243, 245, 246, 73/250, 264, 269

[56] References Cited

U.S. PATENT DOCUMENTS

| | | | |
|---|---|---|---|
| 403,297 | 5/1889 | Stansbrough | 73/264 |
| 2,755,966 | 7/1956 | Lindars | 73/250 X |
| 3,657,925 | 4/1972 | Gross | 73/239 |
| 3,927,601 | 12/1975 | Van de Moortele | 73/264 X |

FOREIGN PATENT DOCUMENTS

52-21858  2/1977  Japan ..................................... 73/239

*Primary Examiner*—Charles A. Ruehl

[57] ABSTRACT

A continuous volume measuring device for measuring the cumulative volume of a flowing fluid. The device includes a pair of coupled expandable chambers, and the fluid flow is directed into a first chamber to expand it while the second chamber is contracting and expelling liquid therefrom, the expansion of the first chamber being measured to determine the volume of fluid being received therein. When a predetermined volume of liquid is received, a valve means diverts the fluid flow to fill the second chamber, the expansion of which is similarly measured, and the first chamber is emptied. In the preferred embodiment, the chambers are precision syringes.

9 Claims, 7 Drawing Figures

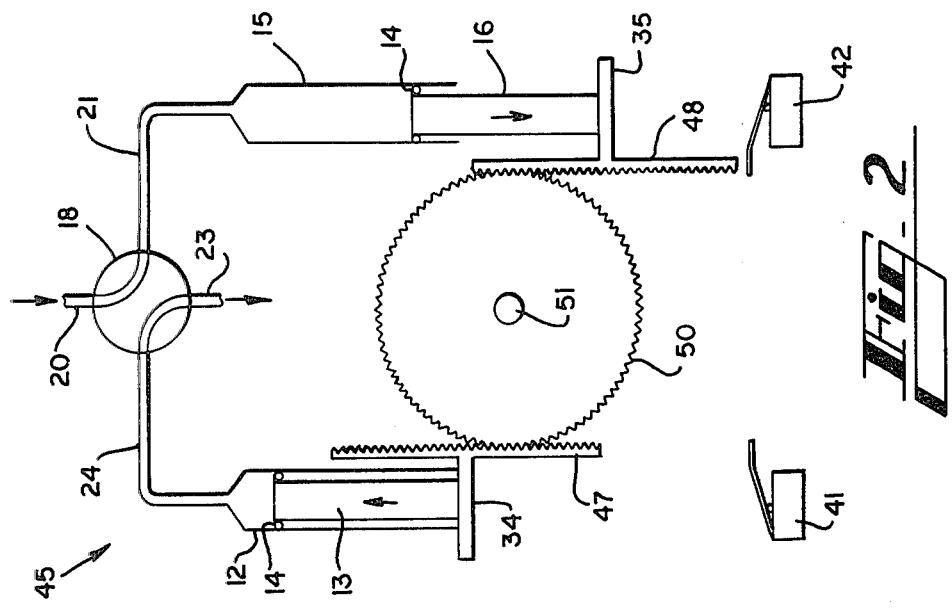
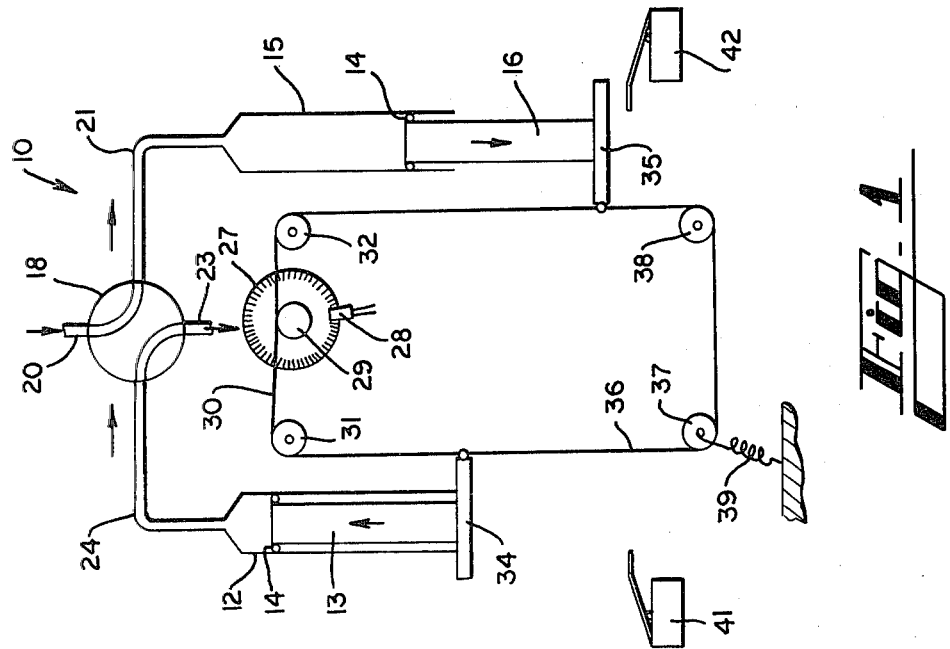

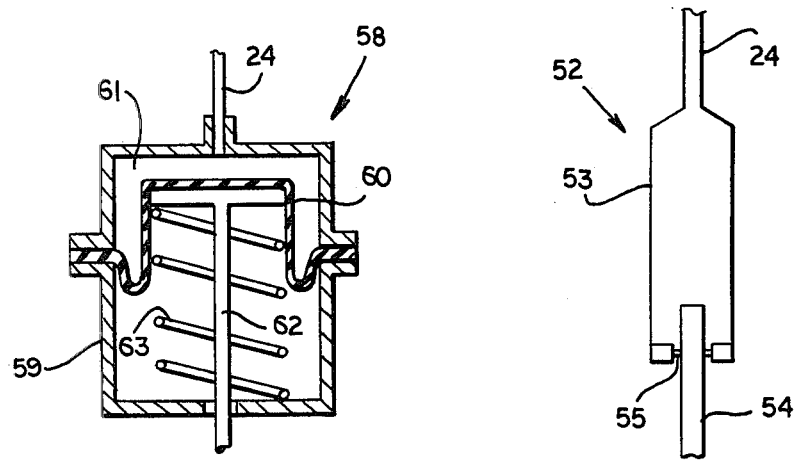
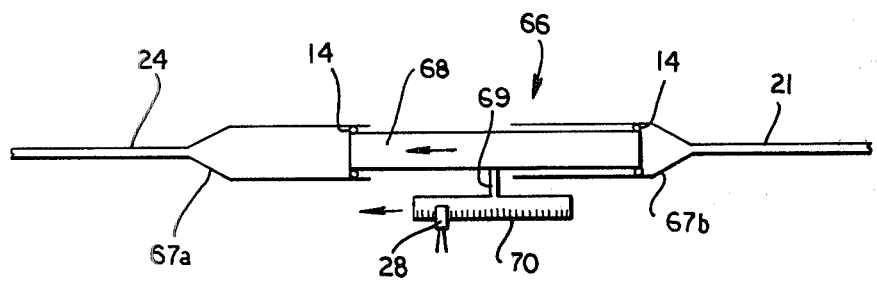
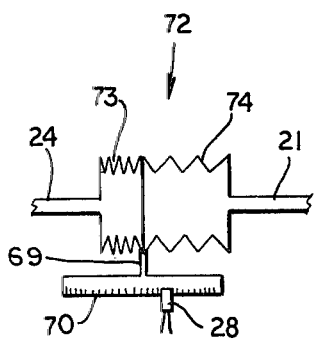
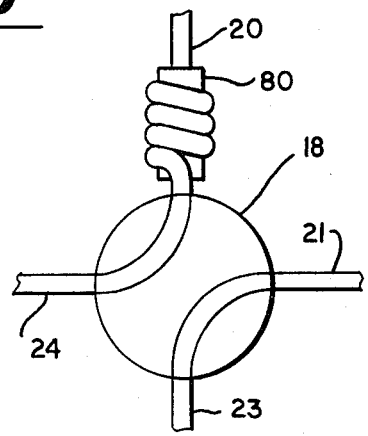

CONTINUOUS VOLUME MEASURING SYSTEM

TECHNICAL FIELD

The present invention relates to measurement of the volume of flowing liquids, and more particularly relates to a system for continuously measuring the volume of eluent flowing through a chromatography system without disrupting the flow through the system.

BACKGROUND ART

Scientific processes often require accurate volume measurements of liquids. Highly accurate volume measurements are particularly important in chromatography. In gel permeation and hydrodynamic chromatography, the cumulative volume of eluent fluid is the key parameter for calculations used to determine the components of the sample being analyzed. In liquid chromatography, the flow rate of eluent through the system must be known at all times to allow accurate interpretation of results, and the most accurate way to determine the flow rate is by using accurate volume and time measurements.

Prior art volume measurement techniques have generally been inconvenient and error prone. Typically, the flowing liquid is collected in a previously empty container of known dimensions, such as a measuring cylinder, pipette, or volumetric flask. This method is limited by the size of the container and is labor intensive if volume accumulation must be recorded at short intervals of time. Floats have been provided in such containers and the rise of the float recorded, but such a system will not suffice for long term accumulations of liquid.

Another method is based on weighing the accumulating liquid, but this requires a knowledge of the density of the liquid. In chromatography, the eluent may be a mixture of two or more chemicals whose mix ratio is altered during the course of an experiment, so that the density and viscosity of the eluent are continuously changing, making accurate volume calculations based on the weight of the accumulated liquid impossible. Changes in density and viscosity also affect the accuracy of flow meters using rotors inserted into the flowing liquid.

Other volume measurement methods include the injection of bubbles of air or heat pulses into the liquid flow. The injections are then timed as they pass between two points. In such a method, short term volume and flow deviations are not detected. Heat pulses cannot be used if the heat would affect the chemical eluent, and in slow flow situations, the heat pulse dissipates and cannot be accurately located. Even under optimum conditions, the bubble or heat pulse cannot always be located with the precision required.

Another volume measurement device is known as a syphon counter. The eluent is accumulated in a U-shaped trap, and when the trap fills, siphon action drains the trap as fast as the liquid viscosity will allow. The departing liquid passes a sensor which adds the known volume of siphoned liquid (typically one milliliter) to the accumulated volume. The time between each discharge allows determination of the flow rate. Accuracy of this system is not sufficient for some forms of chromatography, and the system cannot be used to measure microliter volumes.

SUMMARY OF THE INVENTION

The present invention provides a method and apparatus for the highly accurate measurement of volume of a flowing fluid with negligible disruption of the fluid flow. Generally described, the apparatus comprises a first chamber having a variable volume, a second chamber having a variable volume, a first conduit means for diverting the fluid flow from an input conduit into the first chamber to fill the first chamber and expand the volume thereof, a coupling means for contracting the volume of the second chamber responsive to expansion of the first chamber to force fluid therefrom through a second conduit means to an output conduit, a valve means responsive to the first chamber being filled to a predetermined volume for connecting the input conduit to the second conduit means to fill the second chamber and for connecting the first conduit means to the output conduit to empty the first chamber, and means for alternately measuring the expansion and contraction of the first and second chambers. The first and second chambers preferably comprise identical syringes including plungers slidably movable therein, the measuring means measuring the distance travelled by points on the plungers. The distance travelled can be highly accurately measured using an encoder grating moved past a light source and photodetector. The coupling means can comprise any of several linkage arrangements such as wires and pulleys or a rack and pinion appartus.

The method of the present invention for measuring the volume of a flowing fluid comprises the steps of diverting the fluid into a first expandable chamber to fill such chamber and expand the volume thereof, contracting the volume of a second chamber responsive to expansion of the first chamber to force fluid from the second chamber, responsive to the first chamber being filled to a predetermined volume, diverting the fluid to fill the second chamber while contracting the first chamber to force fluid therefrom, and measuring the expansion and contraction of the chambers.

Thus, it is an object of the present invention to provide a continuous method and apparatus for accurately measuring the volume of a flowing liquid.

It is a further object of the present invention to provide a method and apparatus for measuring the volume of a flowing fluid in a manner such that accurate long term cumulative measurement of the volume of the fluid can be achieved, and instantaneous volume and flow values can be determined throughout the period of flow of the fluid.

It is a further object of the present invention to provide an apparatus for measuring the volume of a flowing fluid by diverting the flow alternately into one of a pair of expandable chambers while emptying the other chamber, and measuring the volume of the flow by measuring the expansion of the chambers.

Other objects, features and advantages of the present invention will become apparent upon reading the following specification, when taken in conjunction with the drawing and the appended claims.

BRIEF DESCRIPTION OF THE DRAWING

FIG. 1 is a schematic representation of a first embodiment of an apparatus for continuous volume measurement embodying the present invention.

FIG. 2 is a schematic representation of a second embodiment of an apparatus for continuous volume measurement embodying the present invention.

FIG. 3 is a cross sectional representation of an alternate embodiment of a chamber that can be used in the embodiments of the invention shown in FIGS. 1 and 2.

FIG. 4 is a cross sectional representation of another alternate chamber that can be used in the embodiments of the invention shown in FIGS. 1 and 2.

FIG. 5 is a partial schematic representation of a third embodiment of an apparatus for continuous volume measurement embodying the present invention.

FIG. 6 is a partial schematic representation of a fourth embodiment of an apparatus for continuous volume measurement embodying the present invention.

FIG. 7 is a schematic representation of the changeover valve of FIGS. 1 and 2 in its second position.

DETAILED DESCRIPTION

Referring now in more detail to the drawing, in which like numerals represent like parts throughout the several views, FIG. 1 is a schematic representation of a continuous volume measuring apparatus 10 that is a first embodiment of the present invention. The volume measuring apparatus 10 includes a first precision syringe 12 having a plunger or piston 13 slidably inserted therein from the bottom of the syringe 12. A seal 14 mounted on the plunger engages the interior walls of the syringe 12 and prevents fluid above the plunger from escaping from the syringe 12. The vertical orientation of the syringe shown in FIG. 1 permits any air bubbles in the fluid flow to be swept up and out of the syringe upon the upward stroke of the plunger 13. A second identical syringe 15 is provided having a plunger 16. It will be seen that each of the syringes 12 and 15 with their plungers 13 and 16, respectively, provide variable volume chambers.

The fluid flow being measured can be diverted to the apparatus 10 through an input conduit 20 which would contain, for example, the output of eluent flow from a chromatograph. A changeover valve 18 is a two-position valve that can be set to direct the flow from the input conduit 20 to a connecting line 21 which delivers the fluid to the second syringe 15 when the valve is in the position shown in FIG. 1. The pressure of such incoming fluid causes the plunger 16 to move downwardly within the syringe 15, expanding the volume of liquid in the syringe 15 above the plunger 16. At the same time, the valve 18 also connects an output conduit 23, which empties to waste or to a recycling circuit, to a connecting conduit 24 from the first syringe 12.

It will be seen that the volume of liquid entering the measuring apparatus 10 from the chromatography system through the input conduit 20 can be accurately determined by measuring the distance traveled by the plunger 16. In the embodiment shown in FIG. 1, this is accomplished by causing the plunger 16 to drive an incremental rotary shaft encoder grating 27 that comprises a glass disc with opaque lines radiating outwardly near the edge of the disc. The encoder grating 27 is rotatably mounted on a shaft 29. A wire or line 30 is wrapped at least one turn around the shaft 29 and extends therefrom in one direction to pass around a guide pulley 32 and then in a vertical direction alongside the syringe 15 to a linkage member 35 fixed to the bottom of the plunger 16. The wire 30 also extends in the opposite direction to pass around a guide pulley 31 and along a vertical path alongside the first syringe 12 to a linkage member 34 attached to the bottom of the plunger 13. Thus, as the syringe 15 fills with liquid and the plunger 16 is forced downwardly, the wire 30 translates linear motion of the plunger 16 into rotational motion of the shaft 29. The encoder grating 27 has associated therewith a light source (not shown) shining through the grating onto a photosensitive detector 28. As the grating 27 rotates, the detector 28 counts interruptions in the light beam caused as the incremental markings on the detector pass through the light beam. Through well known calibration techniques and recorder devices, the electrical output of the photosensitive detector 28 can be utilized to provide a continuous display of the increasing volume of liquid in the syringe 15.

It will also be seen that the motion of the wire 30 pulls the plunger 13 upwardly into the first syringe 12 at the same rate as the plunger 16 is moving downwardly. Thus, liquid in the syringe 12 is exhausted through the connecting conduit 24, the valve 18 and the output conduit 23. The wire 30 and guide pulleys 31 and 32 thus provide a coupling means between the first plunger 13 and the second plunger 16. In order to stabilize the system and provide tension on the wire 30, a tension wire 36 is attached at either end thereof to the linkage members 34 and 35 and is passed about guide pulleys 37 and 38 which are located below the lowermost limit of travel of the plungers 13 and 16 and form the corners of a rectangle with the guide pulleys 31 and 32. The guide pulley 37 is movably mounted and attached to a tension spring 39 that thereby exerts tension on the wires 36 and 30.

A pair of limit switches 41 and 42 are disposed in the path of the plungers 13 and 16, respectively. The limit switches 41 and 42 are connected by means of an electrical circuit (not shown) to the mechanical operating mechanism (not shown) of the valve 18. Thus, when the plunger 16 has been moved a predetermined distance downwardly by the intake of a predetermined amount of liquid into the syringe 15, the linkage member 35 strikes the contact arm of the limit switch 42 and closes the limit switch 42. The electrical circuit immediately causes the valve 18 to be switched to its second position, as shown in FIG. 7, wherein the input conduit 20 is connected to the connecting conduit 24, and the output conduit 23 is connected to the connecting conduit 21. The limit switches 41 and 42 can be located to cause switching of the valve at any point along the stroke of the plungers 13 and 16.

The mechanical switching of the valve 18 occurs in a very short period of time and does not significantly affect the flow of the eluent fluid from the chromatograph. The switch over of the valve 18 affects the accuracy of the volume measurement by only plus or minus one count of the encoder grating 27, representing, for example, a volume of 2.5 microliters or less in magnitude. Following the switch over of the valve 18, the incoming liquid from the input conduit 20 fills the syringe 12 and forces the plunger 13 downward. This movement rotates the encoder grating in the opposite direction, and the photosensitive detector 28 counts the increments of volume as they are added to the syringe 12.

Since the wire 30 is connected to the linkage member 35 of the plunger 16, the motion of the wire 30 caused by the motion of the plunger 13 draws the plunger 16 upwardly into the syringe 15 and expels the fluid from the syringe 15 that was earlier introduced therein. The plunger 13 moves downwardly until it engages and closes the limit switch 41, at which time the valve 18 is switched back to the position shown in FIG. 1, and the cycle is commenced once again.

It will thus be seen that the apparatus shown in FIG. 1 can operate indefinitely to measure the cumulative long term volume of a flowing fluid. The extremely accurate counting of the incoming volume by the encoder 27 can be used both to total the cumulative volume and to calculate instantaneous flow rates. The incremental rotary shaft encoder including the photodetection assembly is commercially available as a unit.

A volume measuring apparatus 45 comprising a second embodiment of the present invention is shown schematically in FIG. 2. The apparatus 45 of FIG. 2 is identical to the apparatus 10 shown in FIG. 1, with the exception that the coupling means is provided by a rack and pinion mechanism rather than by wires and pulleys. Vertically extending rack members 47 and 48 are fixed to the linkage members 34 and 35, respectively. Adjoining the rack members 47 and 48 is a precision pinion gear 50 rotatably mounted on a shaft 51. An incremental rotary shaft encoder (not shown in FIG. 2) identical to the encoder 27 of FIG. 1 is driven by the shaft 51. The limit switches 41 and 42 are disposed so as to be closed by the rack members 47 and 48 when the plungers 13 and 16 reach the desired lowermost limit of their travel. Operation of the embodiment shown in FIG. 2 is the same as that described for the embodiment shown in FIG. 1.

It will be understood by those skilled in the art that other types of variable volume chambers could be used in the embodiments shown in FIG. 1 and FIG. 2 in place of the syringes 12 and 15. One such alternative chamber is shown in FIG. 3, which is a cross sectional representation of a rolling diaphragm chamber 58. The alternate chamber 58 includes a housing 59, a flexible diaphragm 60 dividing the housing 59 to form a liquid chamber 61 above the diaphragm 60, a plunger 62 extending into the housing 59 below the diaphragm 60, and a biasing spring 63 which urges the plunger 62 and the diaphragm 60 upwardly. To utilize the rolling diaphragm chamber 58 in the embodiments shown in FIGS. 1 and 2, a pair of such chambers would be inserted in place of the syringes 12 and 15, so that the liquid chamber 61 would communicate with the connecting lines 21 or 24 and the plunger 62 would be connected, at a point outside the housing 59, to either the wire 30 of FIG. 1 or a rack member 47 or 48 of FIG. 2.

Another alternate variable volume chamber 52 is shown in FIG. 4. The chamber 52 includes a piston housing 53 and a precision piston 54 that extends upwardly into the housing 53. A seal 55 fixed to the housing prevents the escape of liquid from the housing around the piston 54. The chamber 52 shown in FIG. 4 could be utilized in either of the embodiments shown in FIG. 1 and FIG. 2 by substitution of the chamber 52 for the syringes 12 and 15. The piston housing 53 would be connected to one of the connecting conduits 21 or 24, and the piston 54 would be connected to the wire 30 of FIG. 1 or one of the rack members 47 or 48 of FIG. 2.

FIG. 5 shows a partial view of a third embodiment of a volume measuring apparatus 66 according to the invention. The apparatus 66 includes a pair of colinear syringe housings 67a and 67b that open toward one another and receive a common plunger 68 which extends into both housings 67a and 67b and forms a sealing engagement therewith by means of seals 14. A linkage member 69 is connected to the common plunger 68 at the center thereof and joins the plunger 68 to a linear encoder grating 70, the incremental markings of which are counted by a photosensitive detector 28 in a manner similar to that described above. Only a partial schematic representation of the apparatus 66 is shown in FIG. 5, and thus limit switches would be disposed so as to reverse the flow of liquid when the common plunger 68 moves a predetermined distance in either direction, and connecting conduits 21 and 24 communicating with the housings 67a and 67b would be connected to a valve 18 in the manner shown in FIGS. 1 and 2.

A fourth embodiment of a volume measuring device 72 according to the invention is shown in FIG. 6. Such fourth embodiment is identical to the embodiment shown in FIG. 5 with the exception that the housings and common plunger are replaced by a pair of joined bellows 73 and 74. A linkage member 69 joins a linear encoder grating 70 to the point where the bellows are joined together. As liquid is forced into one bellows, the other bellows is contracted, forcing liquid therefrom, and moving the encoder grating 70 past a photosensitive detector 28. Unlike the embodiments of the invention utilizing syringes, the linear distance traveled by the bellows is not necessarily linearly related to the volume received by the bellows.

It will be understood from the above description of embodiments of the invention that a highly accurate method and apparatus for continuously measuring the volume of a flowing fluid is provided which overcomes disadvantages of prior art volume measuring devices. Although the invention is particularly useful in chromatography applications, it can, of course, be applied to other scientific, industrial and commercial uses. Of course, the invention can be used to meter a volume of fluid into a process or apparatus as well as to measure the volume of a fluid flowing out of a process or apparatus.

Since bubbles which can be present in the incoming fluid stream are compressible and can affect the accuracy of the volume measurement, the preferred embodiments of the invention are those shown in FIGS. 1 and 2, wherein any bubbles present in the syringes can be swept out on the return stroke of the plungers. Another factor that can influence the accuracy of volume measurement is variations in temperature of the fluid, and therefore it is contemplated that the input conduit 20 could be coiled about a constant temperature block 80, as shown in FIG. 7 in order to make the temperature of the fluid uniform as it is directed to the volume measuring apparatus of the present invention.

While this invention has been described in detail with particular reference to preferred embodiments thereof, it will be understood that variations and modifications can be effected within the spirit and scope of the invention as described hereinbefore and as defined in the appended claims.

We claim:
1. An apparatus for measuring the volume of a flowing fluid comprising:
    a first variable volume chamber comprising a first syringe including a first plunger slidably movable therein;
    a second variable volume chamber comprising a second syringe including a second plunger slidably movable therein;
    first conduit means for diverting said fluid flow from an input conduit into said first syringe to fill said first syringe and expand the volume thereof by outward movement of said first plunger;

coupling means for contracting the volume of said second syringe by inward movement of said second plunger responsive to said outward movement of said first plunger to force fluid from said second syringe through a second conduit means to an output conduit;

valve means responsive to said first syringe being filled to a predetermined volume for connecting said input conduit to said second conduit means to fill said second syringe and for connecting said first conduit means to said output conduit to empty said first syringe, said coupling means contracting the volume of said first syringe as the volume of said second syringe expands; and detector means continuously responsive to the distance travelled by points on said plungers for continuously providing a signal corresponding to the volume of fluid forced into said output conduit.

2. The apparatus of claim 1 wherein said coupling means comprises a line connected at one end thereof to said first plunger and extending adjacent and parallel to said first syringe, thence about a pulley means and thence adjacent and parallel to said second syringe, said other end of said line being attached to said second plunger.

3. The apparatus of claim 2 wherein said detector means comprises an encoder grating drivingly connected to said line; and photosensitive means for detecting the movement of said encoder grating.

4. The apparatus of claim 1 wherein said coupling means comprises a pair of racks connected to each of said first and second plungers in parallel relation to one another, and a pinion gear engaging both of said racks.

5. The apparatus of claim 1 wherein said first and second syringes comprise rolling diaphragm syringes.

6. An apparatus for measuring the volume of a flowing fluid comprising:
a first chamber having a variable volume;
a second chamber having a variable volume;
first conduit means for diverting said fluid flow from an input conduit into said first chamber to fill said first chamber and expand the volume thereof;
coupling means for contracting the volume of said second chamber responsive to expansion of said first chamber to force fluid therefrom through a second conduit means to an output conduit;
valve means responsive to said first chamber being filled to a predetermined volume for connecting said input conduit to said second conduit means to fill said second chamber and for connecting said first conduit means to said output conduit to empty said first chamber, said coupling means contracting said first chamber as said second chamber expands;
detector means continuously responsive to change in volume of one of said chambers for continuously providing a signal corresponding to a volume of fluid forced into said output conduit; and
means for controlling the temperature of said fluid in said input conduit.

7. A method of measuring the volume of a flowing fluid comprising the steps of:
diverting said fluid from an input conduit into a first expandable chamber to fill said chamber and expand the volume thereof;
contracting the volume of a second expandable chamber responsive to expansion of said first chamber to force fluid from said second chamber;
responsive to said first chamber being filled to a predetermined volume, diverting said fluid to fill said second chamber while contracting said first chamber to force fluid therefrom;
continuously detecting the change in volume of at least one of said chambers;
continuously providing a signal corresponding to the volume of fluid forced from said chambers; and
controlling the temperature of said fluid in said input conduit.

8. An apparatus for measuring the volume of a flowing fluid comprising:
a first syringe having a variable volume;
a second syringe having a variable volume identical to said first syringe;
a first plunger slidably movable in said first syringe;
a second plunger slideably movable in said second syringe;
first conduit means for diverting said fluid flow from an output conduit into said first syringe to fill said first syringe and expand the volume thereof;
coupling means for contracting the volume of said second syringe responsive to expansion of said first syringe to force fluid therefrom through a second conduit means to an output conduit, said coupling means comprising a line connected to one end thereof to said first plunger and extending adjacent and parallel to said first syringe, thence about a pulley means and thence adjacent and parallel to said second syringe, said other end of said line being attached to said second plunger;
valve means responsive to said first syringe being filled to a predetermined volume for connecting said input conduit to said second conduit means to fill said second syringe and for connecting said first conduit means to said output conduit to empty said first syringe, said coupling means contracting said first syringe as said second syringe expands; and
means for measuring change in volume of at least one of said syringes by measuring the distance traveled by points on said plungers.

9. The apparatus of claim 8 wherein said measuring means comprises an encoder grating; a means for connecting said encoder grating to said line and causing said encoder grating to move along a path; and a detector means for measuring the movement of said encoder grating.

* * * * *